US006909960B2

United States Patent
Volponi et al.

(10) Patent No.: US 6,909,960 B2
(45) Date of Patent: Jun. 21, 2005

(54) METHOD FOR PERFORMING GAS TURBINE PERFORMANCE DIAGNOSTICS

(75) Inventors: Allan J. Volponi, West Simsbury, CT (US); Hans R. Depold, Bolton, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/286,203

(22) Filed: Oct. 31, 2002

(65) Prior Publication Data

US 2004/0088100 A1 May 6, 2004

(51) Int. Cl.⁷ .............................................. G06F 19/00
(52) U.S. Cl. ..................... 701/100; 701/29; 702/183; 477/30
(58) Field of Search ............... 701/29, 100; 702/182, 702/183, 184, 185; 477/30

(56) References Cited

U.S. PATENT DOCUMENTS

| | | | | |
|---|---|---|---|---|
| 5,293,323 A | * | 3/1994 | Doskocil et al. | ............. 702/185 |
| 5,566,092 A | | 10/1996 | Wang et al. | |
| 5,951,611 A | * | 9/1999 | La Pierre | ...................... 701/29 |
| 6,128,555 A | * | 10/2000 | Hanson et al. | ................. 701/13 |
| 6,181,975 B1 | | 1/2001 | Gross et al. | |
| 6,456,928 B1 | * | 9/2002 | Johnson | ....................... 701/114 |
| 6,539,337 B1 | * | 3/2003 | Provan et al. | ............... 702/183 |
| 6,662,089 B2 | * | 12/2003 | Felke et al. | .................... 701/29 |

FOREIGN PATENT DOCUMENTS

| | | |
|---|---|---|
| EP | 1 114 991 A2 | 7/2001 |
| WO | 97 41494 | 11/1997 |

OTHER PUBLICATIONS

D.B. Grunberg et al.: "Generation of Optimal and Suboptimal Strategies for Multiple–Fault Isolation", Nov. 3, 1987, Alphatech, Inc., Burlington, MA, pp. 125–131.

* cited by examiner

Primary Examiner—Gary Chin
(74) Attorney, Agent, or Firm—Bachman & LaPointe, P.C.

(57) ABSTRACT

A method of performing diagnostics on a system comprises receiving a plurality of measurement parameters, each corresponding to one of a plurality of parameters at a time k, forming a deviation vector from the plurality of measurement parameters, calculating an initial deviation vector from an initial fault vector, calculating a multiple fault isolation deviation vector using the initial deviation vector and the deviation vector, determining if an event is in progress using the multiple fault isolation deviation vector, performing statistical data validity to set a present inhibit flag and a past inhibit flag, and performing module performance analysis according to the present inhibit flag and the past inhibit flag.

18 Claims, 4 Drawing Sheets

METHOD FOR PERFORMING GAS TURBINE PERFORMANCE DIAGNOSTICS

BACKGROUND OF THE INVENTION

(1) Field of the Invention

The present invention relates to a method for performing diagnostics on a system. More specifically, the present invention relates to a method for diagnosing performance changes in gas turbine engines.

(2) Description of Related Art

The goal of Gas Turbine Performance Diagnostics is to accurately detect, isolate and assess the changes in engine module performance, engine system malfunctions and instrumentation problems from knowledge of measured parameters taken along the engine's gas path. Discernable shifts in engine speeds, temperatures, pressures, fuel flow, etc., provide the requisite information for determining the underlying shift in engine operation from a presumed reference (nominal) state.

Engine performance changes manifest themselves in one of two ways: a) gradual (long term) deterioration or b) rapid (short-term) deterioration or performance restoration. This observation arises from the nature of engine design. Engines are designed to be robust and last. Hence, engines exhibit a gradual accumulation of component damage. However, fit clearances and externally caused damage can change the mode of damage to excessive wear and crack propagation. Such effects may be initially very small but can lead to part failures.

For example, the wear of a bleed linkage may initially cause bleed sticking and scatter in the data due to improper operation, but the eventual linkage failure leads to a step change in performance. Similarly crack propagation can lead to blade tip failures collateral damage, and rapid ramping or even step changes in module deterioration. On-wing and shop maintenance performance restoration shows up as an abrupt improvement in performance. Likewise, part of a production engine's performance is lost abruptly on its first flight because that is when the engine rub-in occurs and sets its initial running clearances.

These modes of damage accumulation affect component (module) performance and engine sub-systems such as bleeds, cooling flows, variable geometry mechanisms, etc. in ways that can be classified in terms of estimated changes in parameters such as efficiencies, flow capacities, and effective nozzle areas. Gradual damage accumulation occurs in all components gradually and requires multiple fault isolation (MFI). Rapid performance degradation is usually traced to a single module or system and sometimes a second module affected by collateral damage and requires single fault isolation (SFI). Rapid performance improvements due to maintenance actions can be traced to the individual modules and systems repaired and isolated appropriately.

There are a number of algorithms available to address the problem of estimating a) the mode of gradual deterioration as well as b) the mode of rapid deterioration in gas turbine system performance. These methods constitute MFI (Multiple Fault Isolation) and SFI (Single Fault Isolation). The former implies that all of the engine components (whose shifts in performance we are estimating) are deteriorating slowly whereas the latter implies a concession, i.e. that a rapid trend shift is most probably due to a single root cause (or perhaps two when there is an interaction or collateral damage).

Typically each form of degradation is diagnosed separately as it occurs. Often a single fault is analyzed with an MFI system because reliable SFI systems are not available. Partitioning SFI and MFI analyses is necessary because an error occurs when single faults are analyzed by MFI algorithms or conversely, when multiple faults are analyzed by SFI methods. In the former case, the single underlying cause is smeared across a plurality of faults with an attendant attenuation and possible lack of identifiability. In the latter case, the gradual degradation in multiple components is erroneously assigned to a single cause. Current diagnostic systems operate without this necessary partitioning and as a consequence do not provide reliable closure of engine performance in test cells and flight.

What is needed is a method that will bring closure between production performance, flight performance, maintenance actions, and shop performance. Preferably, such a method would separate and independently sum the rapid and gradual performance changes experienced by an engine.

SUMMARY OF THE INVENTION

Accordingly, it is an object of the present invention to provide a method for diagnosing the performance of gas turbine engines.

In accordance with the present invention, a method of performing diagnostics on a system comprises receiving a plurality of measurement parameters each corresponding to one of a plurality of parameters at a time k, forming a deviation vector from the plurality of measurement parameters, calculating an initial deviation vector from an initial fault vector, calculating a multiple fault isolation deviation vector using the initial deviation vector and the deviation vector, determining if an event is in progress using the multiple fault isolation deviation vector, performing statistical data validity to set a present inhibit flag and a past inhibit flag, and performing module performance analysis according to the present inhibit flag and said past inhibit flag.

In accordance with the present invention, a method of performing diagnostics on a system comprises receiving a plurality of measurement parameters, each corresponding to one of a plurality of parameters at a time $k_1$, forming a deviation vector from the plurality of measurement parameters, calculating an initial deviation vector from an initial fault vector, calculating a multiple fault isolation deviation vector using the initial deviation vector and the deviation vector, determining if an event is in progress using the multiple fault isolation deviation vector, and performing module performance analysis.

DETAILED DESCRIPTION OF THE PREFERRED EMBODIMENT(S)

The methodology of the present invention allows for both the MFI and SFI processes to operate in concert with one another, automatically, and without corruptive interaction. The cause of a rapid mode of deterioration is isolated quickly so as to avoid a major effect on fleet operations. While described with exemplary reference to an engine, the methodology of the present invention is not so limited. Rather, the present invention is broadly drawn to encompass any system comprised of a plurality of interoperating subsystems or modules that may be measured and quantified during operation.

Figure 1:
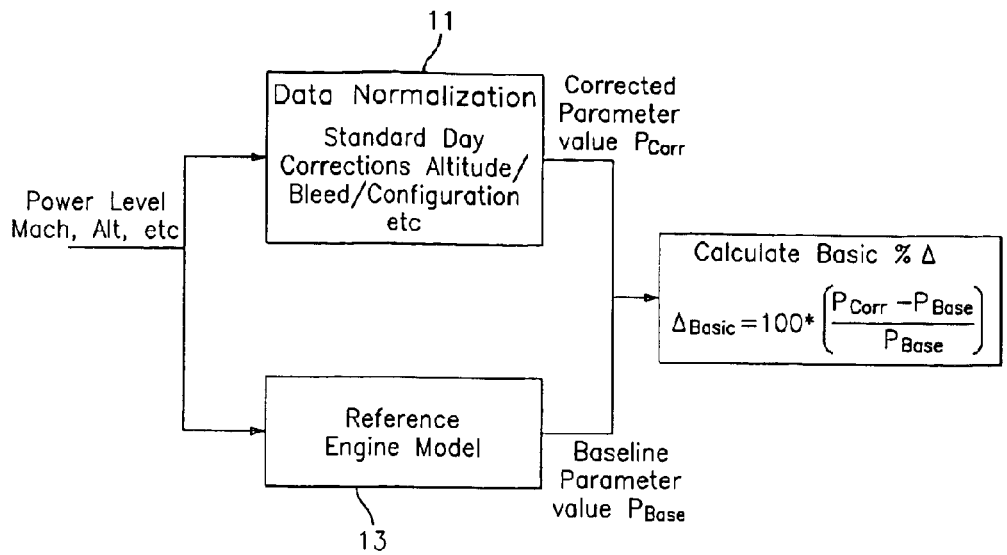
FIG. 1—A logic diagram of the parameter data normalization of the present invention.

Performance Diagnostics determines how engine system and sensor system performance differ from a chosen reference state. Although this reference state can be any user specified level, it is customary to track performance relative to a production level engine, the engine's initial state, or an operator's initial fleet engine average. Whatever the reference, the primary data supporting the system will be the form of measurements deltas (from that reference). For example, a pre-process to calculate basic Measurements Δs would normalize raw gas path parameter data, generate an equivalent reference parameter value and compute the percent delta between them, as illustrated in FIG. 1. As illustrated, measured parameter data is pre-processed in a data normalization step 11 to produce corrected parameter values, $P_{Corr}$. The data normalization step 11 preferably receives as an input environmental variables. The environmental variables are likewise inputs to reference engine model 13. Reference engine model 13 outputs the expected baseline parameter measurements, $P_{Base}$, for a reference engine operating under similar conditions as the engine being monitored. The $P_{Corr}$ and the $P_{Base}$ are combined to produce a $\Delta_{Basic}$.

Pre-processing serves two purposes. First, by correcting the data for aircraft flight conditions the unknowns are reduced by three in the present example since the effects of altitude, Mach Number, and TAT are removed. Next, by comparing the corrected data to the non-linear model of the engine, both the biases of bleed systems, vane and cooling schedules and all other modeled systems are removed and the resulting parameter data is linearized by removing the effects of engine power.

This $\Delta_{Basic}$ calculation is repeated for each measured gas path parameter P of interest (for example, rotor speeds, inter-component temperatures and pressures, etc.) to form a deviation vector of % of point deviations, $Z_k^{Basic}$, at discrete time k. This measurement deviation (from reference) contains the effects of a multitude of possible engine/sensor system fault occurrences as well as random measurement noise (non-repeatability). The success of a practical diagnostic system depends heavily on its ability to partition this total deviation into constituent parts representing the different fault scenarios to allow proper fault isolation.

Figure 2:
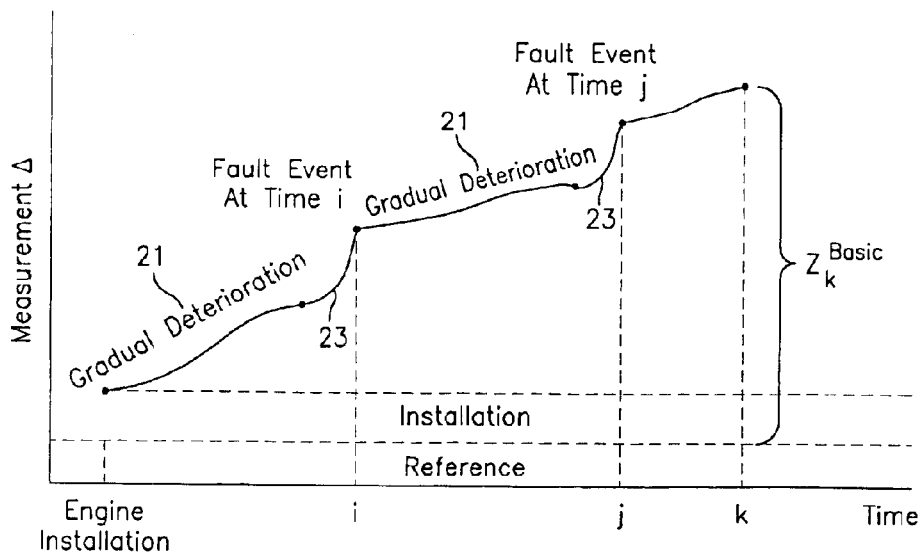
FIG. 2—A diagram of the composition of the total deviation vector of the present invention.

As noted, there are generally two different fault mechanisms to consider, namely gradual deterioration and rapid deterioration. The former concerns itself with the normal process of component degradation over time and would produce slowly increasing and/or decreasing (average) changes in the measurement deviations, whereas the latter is the result of a system fault event which would produce a rapid (temporal) trend shift in the measurement deviations. With reference to FIG. 2, there is illustrated this concept for an arbitrary measurement deviation.

Rapid deterioration periods 23 are interspersed between gradual deterioration periods 21. Rapid deterioration periods 23 coincide with single or double component failure in an engine. Note that the decomposition of the total deviation $Z_k^{Basic}$ at a particular time k, depends on the fault history beginning with the engine installation and continuing through rapid deterioration periods 23, at times i and j, and gradual deterioration periods 21.

It is this fault history that is assessed. To make such an assessment, the following two general assumptions are made. First, gradual deterioration exists for all components under consideration, which, in general, is assumed to be characterized by slow performance shifts in all of the major Modules of the gas turbine (for example, FAN, low pressure compressor (LPC), high pressure compressor (HPC), high pressure turbine (HPT), low pressure turbine (LPT)) as well as the sensors for each of the measurements. The analysis methodology for this type of fault isolation is Multiple Fault Isolation (MFI). Second, rapid degradation occurs as the result of a single (or perhaps at most two) component failure(s) (full or partial). The analysis methodology for this type of temporal event fault isolation is Single Fault Isolation (SFI).

The overall isolation strategy at time k requires that one 1) recognize which fault mechanism (slow or rapid) is occurring, 2) know the past history of fault mechanisms for times prior to k, 3) have cumulative record of the assessed fault isolations for times prior to k, 4) partition the current total measurement deviation into its appropriate constituent parts, and 5) apply the appropriate analysis methodology to isolate the fault(s) at time k.

Figure 3:
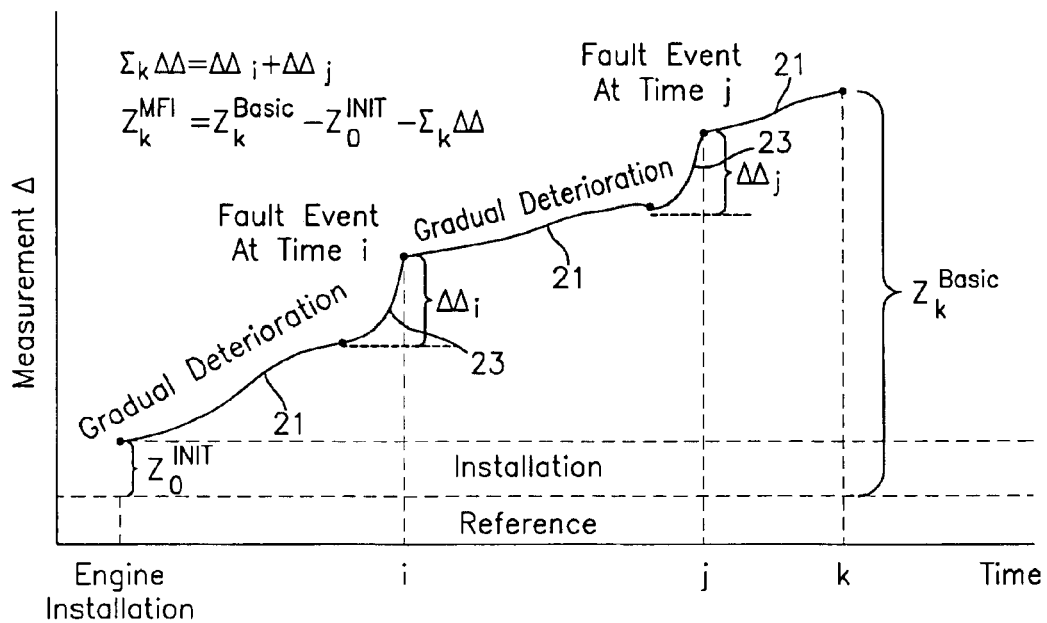
FIG. 3—A diagram of the composition of the total deviation vector of the present invention graphically annotated with the derivation of additional variables of import.

A pivotal requirement to accomplish this strategy is to partition the Basic Measurement Δ vector, $Z_k^{Basic}$, into several components as follows:

$$Z_k^{Basic} = Z_0^{INIT} + Z_k^{MFI} + \Sigma_k \Delta\Delta$$

where $Z_0^{INIT}$ = portion due to the difference between the engine and the reference at installation $Z_k^{MFI}$ = portion due to the gradual degradation $\Sigma_k \Delta\Delta$ = portion due to the cumulative effect of (rapid) deterioration events up to current time k i.e. $\Sigma_k \Delta\Delta = \Delta\Delta_i + \Delta\Delta_j$ With reference to FIG. 3, there is graphically illustrated the annotation of the preceding quantities to FIG. 2. In general, if there is a rapid deterioration event at discrete time i, then $\Delta\Delta_i$ represents the change in the Measurement Δ vector since the initiation of the event.

Each of these (Z) vectors is an array of m×1 measurement deltas. For example, the total measurement vector might include $$Z^{Basic} = \begin{bmatrix} \Delta N1 \\ \Delta N2 \\ \Delta Wf \\ \Delta T3 \\ \Delta P3 \\ \vdots \end{bmatrix} = \begin{bmatrix} \Delta \text{ Low Spool Speed} \\ \Delta \text{ High Spool Speed} \\ \Delta \text{ Fuel Flow} \\ \Delta \text{ HC Exit Temperature} \\ \Delta \text{ HC Exit Pressure} \\ \vdots \end{bmatrix}$$

$$= 100 \begin{bmatrix} (N1_{corr} - N1_{base})/N1_{base} \\ (N2_{corr} - N2_{base})/N2_{base} \\ (Wf_{corr} - Wf_{base})/Wf_{base} \\ (T3_{corr} - T3_{base})/T3_{base} \\ (P3_{corr} - P3_{base})/P3_{base} \\ \vdots \end{bmatrix} (m \times 1)$$

Corresponding to each of the Measurement Δ vector components are vectors of engine system and sensor faults as follows:

$x_0^{INIT} \Leftrightarrow Z_0^{INIT}$ $x_k^{MFI} \Leftrightarrow Z_k^{MFI}$ $\Delta x_k^{SFI} \Leftrightarrow \Delta \Delta_k$ $\Sigma_k \Delta x^{SFI} \Leftrightarrow \Sigma_k \Delta \Delta$ $x_h \Leftrightarrow Z_h^{Basic}$ Each of these (x) vectors is an array of n×1 measurement deltas. For example, $$x_k = \begin{bmatrix} \Delta \eta_{FAN} \\ \Delta \Gamma_{FAN} \\ \Delta \eta_{HC} \\ \Delta \Gamma_{HC} \\ \vdots \\ \Delta \eta_{HT} \\ \Delta A_4 \\ \Delta N1_{error} \\ \Delta N2_{error} \\ \Delta Wf_{error} \\ \vdots \\ \Delta Bleed_{25} \\ \Delta Bleed_{29} \\ \vdots \\ \Delta TCC \end{bmatrix} \begin{bmatrix} \Delta \text{ Fan Efficiency} \\ \Delta \text{ Fan Flow Capacity} \\ \Delta \text{ High Compressor Efficiency} \\ \Delta \text{ High Compressor Flow Capacity} \\ \vdots \\ \Delta \text{ High Turbine Efficiency} \\ \Delta \text{ High Turbine Nozzle Area} \\ \Delta N1\_sensor\_error \\ \Delta N2\_sensor\_error \\ \Delta Wf\_sensor\_error \\ \vdots \\ \Delta Bleed\_station25 \\ \Delta Bleed\_station29 \\ \vdots \\ \Delta Turbine\_Case\_Cooling \end{bmatrix} (n \times 1)$$

Just as the total Measurement Δ vector is the sum of its components, i.e.

$$Z_k^{Basic} = Z_0^{INIT} + Z_k^{MFI} + \Sigma_k \Delta \Delta$$

the total fault vector is the sum of its constituents, i.e.

$$x_k = x_0^{INIT} + x_k^{MFI} + \Sigma_k \Delta x^{SFI}$$

Each of these constituents must be estimated on the basis of the Measurement Δ and other available information. There are many techniques that have been developed to aid in the estimation of these quantities and these methods have become specialized to the particular fault estimation task at hand. Examples of such methodologies include, but are not limited to, statistical tests and applied neural networks. Without reference to any particular methodology we will generically refer to these processes as indicated in Table 1.

TABLE 1

Primary Fault Isolation Modules

| Process | Symbol | Description | Output Estimate |
|---|---|---|---|
| MFI Initialization | MFI INIT | Estimates the initial estimate for the performance difference between the specific engine and the reference. The typically consists of the Module efficiencies and flow parameters. | $\hat{x}_0^{INIT}$ |
| Multiple Fault Isolation | MFI | Estimates the cumulative change in Module performance due to gradual deterioration in those components. | $\hat{x}_\lambda^{MFI}$ |
| Single Fault Isolation | SFI | Estimates the incremental and cumulative engine/sensor faults associated with a rapid degradation event. | $\Delta \hat{x}_\lambda^{SFI}, \Sigma_k \Delta \hat{x}^{SFI}$ |

Along with the primary estimation routines, there is a need to provide modules to perform data validity checks and trend detection on the total Measurement Δ input. Once again, there exist a variety of methodologies to perform these tasks and without reference to any particular approach we will generically refer to these processes as indicated in Table 2.

TABLE 2

Auxiliary Support Fault Modules

| Process | Symbol | Description | Output |
|---|---|---|---|
| Statistical Data Validity | SDV | Provides statistical (and possibly heuristic) checks on (time) sequential Measurement Δ vector input to detect and accommodate outliers and differentiate between outliers and engine/sensor system event trend shifts. | updated $Z_\lambda^{MFI}$ flags: $Inhibit_{present}$ $Inhibit_{past}$ |
| Trend Detector | TD | Determines If a trend event is occurring Measurement ΔΔ trend shift Event Time (start, detection, end) | $\Delta \Delta_k$ $\Sigma_\lambda \Delta \Delta$ $k_{start}, k_{detect}, k_{end}$ |

Figure 4:
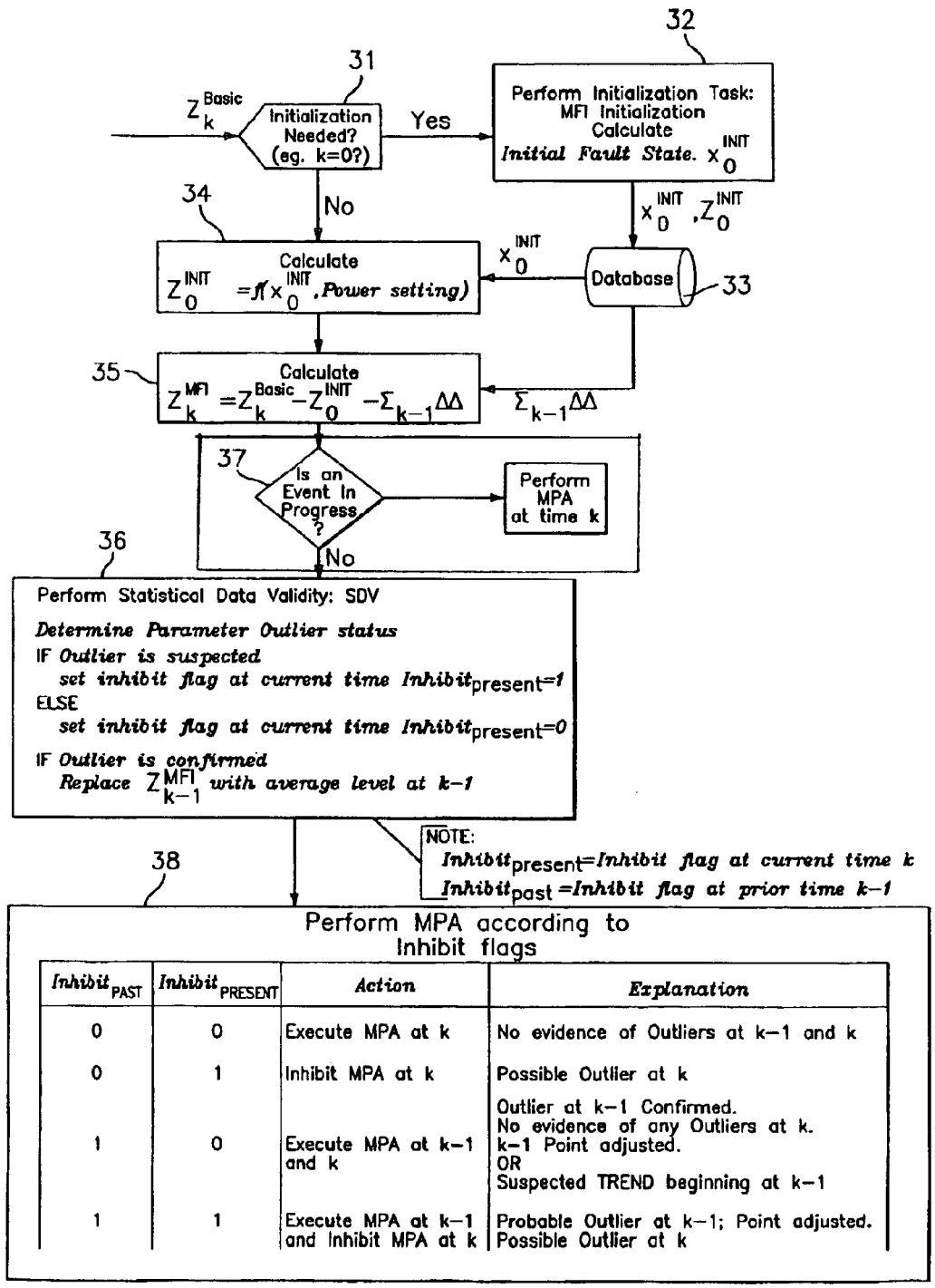
FIG. 4—A logic diagram of the pre-Module Performance Analysis (MPA) steps of the present invention.

The overall process is referred to as Module Performance Analysis (MPA) and is described with reference to FIGS. 4 and 5.

Initially, a determination is made at initialization step 31 as to whether or not initialization is needed. If initialization is required initialization step 32 is performed to calculate initial fault state $X_o^{INIT}$ which is stored in database 33. If initialization is not required, calculate initial Z step 34 is performed whereby $Z_o^{INIT}$ is calculated and outputted using $X_o^{INIT}$ as an input received from database 33. Next, calculate MFI Z step 35 is performed whereby $Z_k^{MFI}$ is calculated receiving input from database 33 and the output from calculate initial Z step 34. A determination is then made at event decision step 37 as to whether or not an event is occurring.

If an event is determined to not be in progress, SDV step 36 is performed. Statistical Data Validity is performed to determine if the current measurement is an outlier and to set present and past inhibit flags according to the following logic:

Determine Parameter Outlier Status
IF Outlier is suspected
  set inhibit flat at current time $Inhibit_{present}=1$
ELSE
  set inhibit flat at current time $Inhibit_{present}=0$
IF Outlier is confirmed
  Replace $Z_{k-1}^{MFI}$ with average level at k−1

Next MPA is performed as shown in inhibit MPA step 38 whereby MPA is either executed or inhibited based upon the flags set in SDV step 36.

Figure 5:
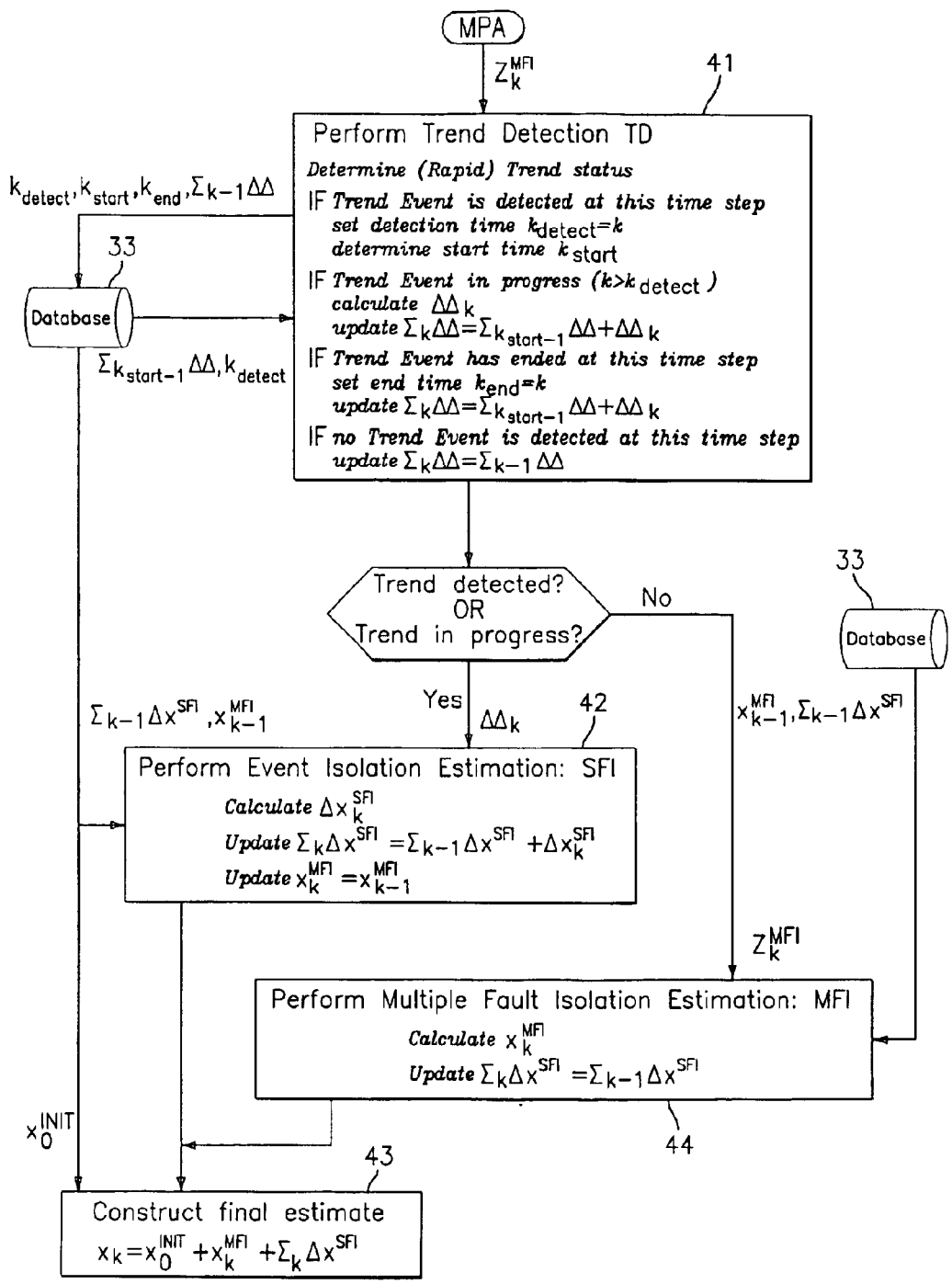
FIG. 5—A logic diagram of the Module Performance Analysis steps of the present invention.

With reference to FIG. 5, there is illustrated in detail the logic flow of the MPA of the present invention. Receiving as input $Z_k^{MFI}$, where k is chosen in accordance with the output of inhibit MPA step 38, trend detection step 41 is performed with the following logic:

Perform Trend Detection: TD

Determine (Rapid) Trend status

IF Trend Event is detected at this time step
   set detection time $k_{detect}$=k
   determine start time $k_{start}$ IF Trend Event in progress ($k \geq k_{detect}$)
   calculate $\Delta\Delta_k$
   update $\Sigma_k \Delta\Delta = \Sigma_{k_{start}} \Delta\Delta + \Delta\Delta_k$ IF Trend Event has ended at this time step
   set end time $k_{end}$=k
   update $\Sigma_k \Delta\Delta = \Sigma_{k_{start}} \Delta\Delta + \Delta\Delta_k$ IF no Trend Evend is detected at this time step
   update $\Sigma_k \Delta\Delta = \Sigma_{k-1} \Delta\Delta$ If a trend, or fault, is detected or is in process, single fault isolation step 42 is performed whereby $\Delta x_k^{SFI}$ is calculated and $\Sigma_k \Delta x^{SFI}$ and $x_k^{MFI}$ are updated before being combined with $x_0^{INIT}$ in final estimate construct 43. If a fault or trend is not detected, multiple fault isolation step 44 is performed whereby $x_k^{MFI}$ is calculated and $\Sigma_k \Delta_x^{SFI}$ is updated before being combined with $x_0^{INIT}$ in final estimate construct 43 step to form a total fault vector.

It is apparent that there has been provided in accordance with the present invention a method of performing gas turbine performance diagnostics. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A method of performing diagnostics on a system comprising:

receiving a plurality of measurement parameters, each corresponding to one of a plurality of parameters at a time k;

forming a deviation vector from said plurality of measurement parameters;

calculating an initial deviation vector from an initial fault vector;

calculating a multiple fault isolation deviation vector using said initial deviation vector and said deviation vector;

determining if an event is in progress;

performing statistical data validity to set a present inhibit flag and a past inhibit flag if said event is not in progress; and performing module performance analysis based upon said multiple fault isolation deviation vector according to said present inhibit flag and said past inhibit flag if said event is not in progress.

2. The method of claim 1, wherein said performing module performance comprises the additional steps of:

receiving said multiple fault isolation deviation vector;

performing trend detection using said multiple fault isolation deviation vector;

performing isolation estimation;

constructing a total fault vector.

3. The method of claim 2, wherein said isolation estimation comprises the step of performing event isolation estimation.

4. The method of claim 2, wherein said isolation estimation comprises the step of performing multiple fault isolation estimation.

5. The method of claim 1, wherein said receiving said plurality of measurement parameter comprises receiving a percent deviation.

6. The method of claim 5, comprising the additional step of processing said plurality of measurement parameters to correct for a plurality of conditions.

7. The method of claim 6, wherein said processing said plurality of measurement parameters to correct for a plurality of conditions comprises processing said plurality of measurement parameters to correct for a plurality of conditions selected from the group consisting of mach number, altitude, and power level.

8. The method of claim 1, wherein said receiving said plurality of measurement parameters comprises receiving a plurality of engine parameters.

9. The method of claim 8, wherein said receiving said plurality of engine parameters comprises receiving a plurality of flow parameters.

10. A method of performing diagnostics on a system comprising:

receiving a plurality of measurement parameters each corresponding to one of a plurality of parameters at a time k;

forming a deviation vector from said plurality of measurement parameters;

calculating an initial deviation vector from an initial fault vector;

calculating a multiple fault isolation deviation vector using said initial deviation vector and said deviation vector;

determining if an event is in progress; and performing module performance analysis based upon said multiple fault isolation deviation vector if said event is in progress.

11. The method of claim 10, wherein said performing module performance comprises the additional steps of:

receiving said multiple fault isolation deviation vector;

performing trend detection using said multiple fault isolation deviation vector;

performing isolation estimation;

constructing a total fault vector.

12. The method of claim 11, wherein said isolation estimation comprises the step of performing event isolation estimation.

13. The method of claim 11, wherein said isolation estimation comprises the step of performing multiple fault isolation estimation.

14. The method of claim 10, wherein said receiving said plurality of measurement parameter comprises receiving a percent deviation.

15. The method of claim 14, comprising the additional step of processing said plurality of measurement parameters to correct for a plurality of conditions.

16. The method of claim 15, wherein said processing said plurality of measurement parameters to correct for a plurality of conditions comprises processing said plurality of measurement parameters to correct for a plurality of conditions selected from the group consisting of mach number, altitude, and power level.

17. The method of claim 10, wherein said receiving said plurality of measurement parameters comprises receiving a plurality of engine parameters.

18. The method of claim 17, wherein said receiving said plurality of engine parameters comprises receiving a plurality of flow parameters.

* * * * *